United States Patent
Jaouen

(10) Patent No.: US 12,536,305 B2
(45) Date of Patent: Jan. 27, 2026

(54) CONFIGURATION METHOD

(71) Applicant: STMicroelectronics (Grand Ouest) SAS, Le Mans (FR)

(72) Inventor: Michel Jaouen, Yvre l'Eveque (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 100 days.

(21) Appl. No.: 18/543,323

(22) Filed: Dec. 18, 2023

(65) Prior Publication Data

US 2024/0211611 A1    Jun. 27, 2024

(30) Foreign Application Priority Data

Dec. 21, 2022  (FR) ...................................... 2214163

(51) Int. Cl.
  *G06F 21/60* (2013.01)
  *G06F 21/57* (2013.01)
  *G06F 21/78* (2013.01)

(52) U.S. Cl.
  CPC ............ *G06F 21/602* (2013.01); *G06F 21/57* (2013.01); *G06F 21/78* (2013.01)

(58) Field of Classification Search
  CPC ........ G06F 21/602; G06F 21/57; G06F 21/78; G06F 21/572; G06F 21/51; G06F 21/44
  See application file for complete search history.

(56) References Cited

U.S. PATENT DOCUMENTS

| | | | | |
|---|---|---|---|---|
| 6,286,036 | B1* | 9/2001 | Rhoads | G06K 7/1417 |
| | | | | 707/E17.112 |
| 6,959,386 | B2* | 10/2005 | Rhoads | G06Q 20/40145 |
| | | | | 713/176 |
| 8,386,990 | B1* | 2/2013 | Trimberger | H01L 23/544 |
| | | | | 326/38 |
| 11,336,425 | B1* | 5/2022 | Lablans | H04J 13/0029 |
| 2004/0199786 | A1* | 10/2004 | Walmsley | G06F 21/74 |
| | | | | 713/190 |
| 2015/0052616 | A1* | 2/2015 | Hutchison | G06F 3/0632 |
| | | | | 726/27 |
| 2016/0366109 | A1* | 12/2016 | Lablans | G06Q 20/34 |
| 2017/0353302 | A1* | 12/2017 | Fernandez | H04L 9/14 |
| 2020/0296573 | A1* | 9/2020 | Kulkarni | H04W 8/183 |
| 2022/0360978 | A1* | 11/2022 | Li | H04W 12/40 |

OTHER PUBLICATIONS

INPI Search Report and Written Opinion for priority application, FR Appl. 2214163, report dated Aug. 16, 2023, 10 pgs.

* cited by examiner

*Primary Examiner* — Joseph P Hirl
*Assistant Examiner* — Aayush Aryal
(74) *Attorney, Agent, or Firm* — Crowe & Dunlevy LLC

(57) ABSTRACT

An electronic device is configured to support at least two configurations, one of the configurations being installed. The device includes a memory. In a limited-access region of the memory, a binary word is stored. That binary word has: a first value representative of the version of the installed configuration; and at least one second value indicating which configurations can be installed. A method of configuration of the electronic device includes determining, according to the second value, whether the configuration which attempts to be installed is permitted.

18 Claims, 2 Drawing Sheets

CONFIGURATION METHOD

PRIORITY CLAIM

This application claims the priority benefit of French Application for Patent No. 2214163, filed on Dec. 21, 2022, the content of which is hereby incorporated by reference in its entirety to the maximum extent allowable by law.

TECHNICAL FIELD

The present disclosure generally concerns electronic devices and, in particular, devices comprising a plurality of configurations and their authentication methods.

BACKGROUND

The integrated circuit (IC) also called electronic chip, is an electronic component, based on a semiconductor, replicating one or a plurality of more or less complex electronic functions, often integrating several types of basic electronic components in a small volume (on a small wafer), making the circuit easy to implement.

There exists a very large variety of these components divided into two large categories: analog and digital.

SUMMARY

In an embodiment, a method is provided for configuration of an electronic device configured to support at least two configurations, one of the configurations being installed. The electronic device comprises a memory, the memory comprising, in a limited-access region, a binary word comprising: a first value representative of the version of the installed configuration; and at least one second value indicating which configurations can be installed. The method comprises: determining according to the second value whether the configuration which attempts to be installed is permitted.

According to an embodiment, the memory comprises a read-only region having an encryption key configured to decrypt the updates of the configurations contained therein.

According to an embodiment, the same encryption key is used for the updates of all configurations.

According to an embodiment, the files of the supported configurations are all contained in a memory of the device.

According to an embodiment, only the manufacturer can write the binary word.

According to an embodiment, the first value is contained in a first portion of the binary word.

According to an embodiment, the second value is contained in a second portion of the binary word.

According to an embodiment, each configuration is associated with a third value, the second portion comprises a first sub-portion having the third value representative of the installed configuration contained therein.

According to an embodiment, the third values associated with the configurations are classified in such a way that the increase of the value corresponds to the increase of a characteristic of the configurations.

According to an embodiment, the binary word only comprises the first portion and the second sub-portion, and configurations others than that associated with the third value cannot be installed.

According to an embodiment, the binary word comprises a second sub-portion indicating, for each supported configured, whether the configuration can be installed or not.

According to an embodiment, the second sub-portion comprises one bit for each supported configuration, the bit taking a fourth value if the installation of said configuration is possible and a fifth value if the installation of said configuration is not possible.

According to an embodiment, the binary word comprises a second sub-portion comprising a minimum value, and configurations associated with values smaller than the minimum value cannot be installed.

According to an embodiment, the binary word comprises a third sub-portion comprising a maximum value, and configurations associated with values greater than the maximum value cannot be installed.

According to an embodiment, the binary word comprises a second sub-portion comprising a value having a first value to indicate that all configurations can be installed, a second value to indicate that no configuration can be installed other than the installed configuration, a third value to indicate that only configurations associated with a value smaller than the value of the installed configuration be installed, and a fourth value to indicate that only the configurations associated with a value greater than the value of the installed configuration can be installed.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made, unless specified otherwise, to the orientation of the figures.

Unless specified otherwise, the expressions "around", "approximately", "substantially" and "in the order of" signify within 10%, and preferably within 5%.

Figure 1:
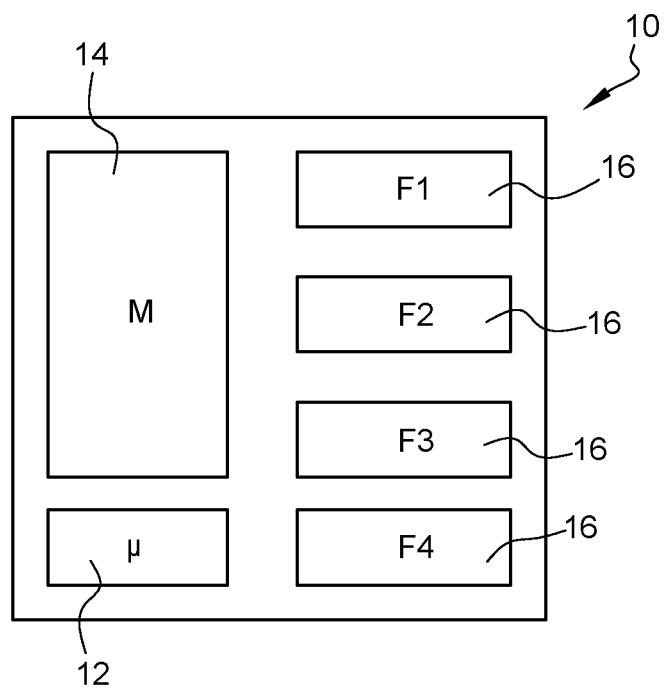
FIG. 1 shows an embodiment of an electronic device.

FIG. 1 shows an embodiment of an electronic device 10. Device 10 is, for example, a chip. Device 10 is, for example, an integrated circuit (IC).

Device 10 comprises, for example, a controller, for example a microcontroller 12 (μ). Device 10 comprises, for example, a memory 14 (M). Memory 14 contains code lines, for example corresponding to the software controlling the device and in particular microcontroller 12. Memory 14 is, for example, a non-volatile memory, for example a read-only memory (ROM).

Device 10 comprises at least one element, for example a circuit, 16 configured to carry out one or a plurality of functions (F1-F4). In the example of FIG. 1, device 10 comprises four elements 16. Each of elements 16 is, for example, configured to implement a different function from among functions F1, F2, F3, or F4. Elements 16, for example, implement functions such as cryptography, input/output interfaces, etc. Elements 16, for example, correspond to peripherals, such as optoelectronic devices, man-machine interfaces, etc. Preferably, at least one element 16 allows a connection to a network, for example, an Internet connection by a wireless Internet access.

According to the application of the device, it is possible for elements 16 not to be used by the device in operation. Indeed, to simplify the manufacturing, more precisely to avoid having to modify the steps of the manufacturing method, identical devices 10 are manufactured, and are subsequently configured to determine which functions can be used by the user. For example, certain devices 10 may be configured to only have access to part of elements 16. For example, certain devices 10 may be configured to only be able to use one or a plurality of elements 16 in certain ways.

Figure 2:
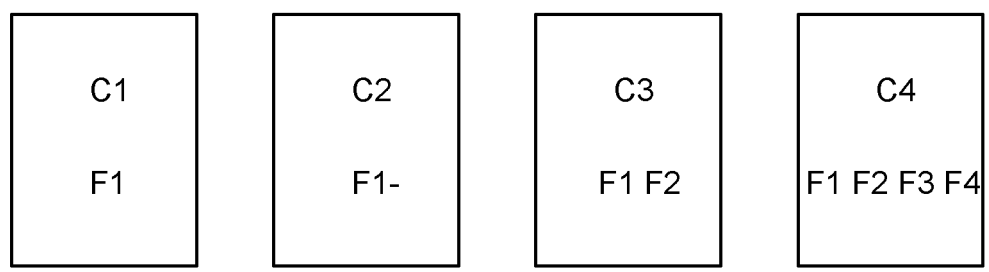
FIG. 2 schematically shows the operation of the device of FIG. 1.

FIG. 2 schematically illustrates the operation of the device of FIG. 1. More precisely, FIG. 2 illustrates four examples of configurations C1, C2, C3, C4 capable of being applied to the device of FIG. 1.

Each configuration C1 to C4, for example, corresponds to a file of codes or of values of configuration parameters. Each configuration C1 to C4 is a binary program enabling to support the function usage. The binary content contained in each configuration, that is, the binary information, varies according to the function(s) to be supported. The binary content may vary over time during the use of the function(s). Further, the binary content may be updated, for example to correct data in the configuration file. The different possible configuration files are contained in a memory, for example, in memory 14.

A configuration C1 (F1) is such that only the element 16 enabling to carry out function F1 is operating. Thus, it is not possible for the device to use elements 16 for functions F2, F3, and F4.

A configuration C2 (F1−) is such that only the element 16 enabling to carry out function F1 is operating. However, the criteria of use of function F1 are stricter than in the case of configuration C1. For example, function F1 can only be used under certain circumstances, for example, only by a user having an encryption key.

A configuration C3 (F1 F2) is such that the elements 16 enabling to carry out function F1 and function F2 are operating. Thus, it is not possible for the device to use elements 16 for functions F3 and F4.

A configuration C4 (F1 F2 F3 F4) is such that the elements 16 enabling to carry out functions F1, F2, F3, and F4 are operating.

Devices 10 are, for example, all manufactured to be identical and to contain all the possible configuration files. The configuration files contained in the device are, for example, the most recent versions of the configuration files. The configuration files may subsequently along the lifetime of the device be updated and then contain a next version of the configuration file.

The configuration file corresponding to the application for which each device is intended is, after the manufacturing and for example before the selling to a user, installed in the device. In other words, the configuration parameters are installed and implemented by the different elements of the device. The installed configuration, that is, the active configuration, thus determines the elements that can be used and, for example, determines the authorization levels. The installation of a configuration different from that intended to be implemented by the device, for example, configuration C1 for a device intended to implement configuration C3, would cause a denial of service to the user who could not use function F2.

The configurations, that is, the configuration files, are for example public. In other words, the configuration files are, for example, accessible by any user having access to the device.

The authorization values are, for example, different according to the installed configuration. In other words, according to the configuration, certain users or software may have or not access to certain regions of the memory or to certain elements 16.

Figure 3:
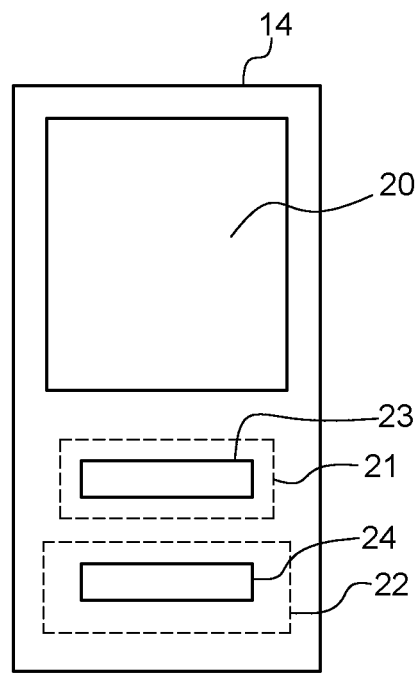
FIG. 3 shows in further detail a portion of the device of FIG. 1.

FIG. 3 shows in further detail a portion of the device of FIG. 1. More precisely, FIG. 3 schematically illustrates the content of a memory of the device 10 of FIG. 1, for example, of memory 14.

The configurations C1 to C4 described in relation with FIG. 2 are contained in a region 20 of memory 14. Region 20 preferably comprises all the configuration files. As a variant, at least one configuration file may be contained in a different memory, for example another non-volatile memory.

Preferably, a device 10 contains, preferably in memory 14, a single version of each configuration file. Thus, when a configuration file is updated, the new version replaces the previous one.

The updates are preferably provided by the manufacturer. The updates are, for example, provided over an Internet connection. The files of the updates of the configuration files are, for example, encrypted when they are supplied to the device.

The memory comprises a region 21. Region 21 has a limited access. Region 21 preferably is a read-only region. In other words, the content of memory 21 is written by the manufacturer and can then no longer be modified.

Region 21 comprises a binary word 23. Word 23 corresponds to an encryption key intended to decrypt the updates of the configuration files. Preferably, the updates of all the configurations C1 to C4 are encrypted by the same encryption key 23.

Memory 14 comprises a region 22. Region 22 has a limited access. Region 22, for example, comprises the boot code of device 10. The access to region 22 is, for example, limited to a high security level. The boot code is a code configured to read from the different regions of the memory to control them before implementing the code of region 20. More precisely, the code of region 21 enables to authenticate the code of region 20. Region 22 may, however, be read from and written into by users having the authorization. For example, devices supplying the legitimate updates, for example, the manufacturer, are authorized to write into region 22.

Region 22 comprises a binary word 24. Word 24 comprises, in a first portion, the number of the version of the installed configuration and comprises a second portion representative of the configurations that can be installed.

When a configuration is updated, the update is decrypted by key 21. The value of the version of the update is then compared with the number of the version of the installed configuration located in word 24. The device further verifies, with word 24, that the update effectively corresponds to an authorized configuration. Word 24 is then modified by the boot code to contain the new value of the version of the configuration. The configuration files are, for example, contained in the memory in a decrypted state.

Similarly, when a user attempts to modify the configuration of the device, the device determines, by means of the second portion of word 24, whether the configuration which is desired to be installed is authorized.

The configurations are preferably accessible to the public, that is, accessible at all accessibility levels.

Figure 4:
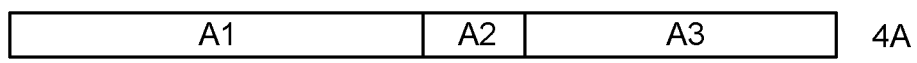
FIG. 4 illustrates implementation modes of a configuration authentication method.
Figure 4:
Figure 4:
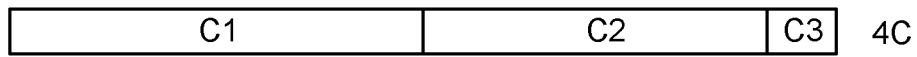

FIG. 4 illustrates implementation modes of a configuration authentication method. More precisely, the drawing shows three embodiments of word 24. FIG. 4 thus comprises three views 4A, 4B, and 4C respectively illustrating words 24A, 24B, and 24C corresponding to embodiments of word 24.

The size of word 24 preferably corresponds to the maximum size of a word in memory 14. Word 24, for example, comprises 32 bits.

The word 24A of view 4A comprises at least two portions: a first portion A1 and a second portion A2. Word 24A, for example, comprises a third portion A3.

First portion A1 contains the value of the version of the installed configuration. The first portion only comprises the value of the version of the installed configuration. Portion A1 has a size smaller than the total size of word 24A. Portion A1, for example, has a size in the range from one third to two thirds of the total size of word 24A, for example, half the total size of word 24A. Thus, if word 24A comprises 32 bits and portion A1 corresponds to half of word 24A, portion A1 comprises 16 bits and can thus comprise a configuration version value ranging from version 0 to version 65535.

Second portion A2 corresponds to a value representative of the installed configuration. Thus, each possible configuration present in the memory is, for example, assigned a binary value. This binary value is contained in portion A2. The size of portion A2, for example, depends on the number possible configurations. In the example of FIG. 2, the device for example comprises four possible configurations. Portion A2, for example, has a two-bit size. For example, configuration C1 corresponds to a binary value 00 in portion A2, configuration C2 corresponds to a binary value 01 in portion A2, configuration C3 corresponds to a binary value 10 in portion A2, and configuration C4 corresponds to a binary value 11 in portion A2.

Word 24A, for example, only comprises the first and second portions. In this case, the device is configured so that the configuration cannot be changed. In other words, a configuration which does not correspond to the number of portion A2 identifying an authorized configuration cannot be installed.

Portion A3, for example, comprises additional information concerning the configurations that can be installed. For example, portion A3 comprises one bit per possible configuration, the bit having a first binary value, for example, value 0, if the corresponding configuration can be installed, or value 1, if the corresponding configuration cannot be installed.

The word 24B of view 4B comprises, like word 24A, at least two portions: a first portion B1 and a second portion B2. Portion B1 is, for example, identical to portion A1. Portion B2 is, for example, identical to portion A2. Word 24B, for example, comprises a third portion B3 and a fourth portion B4.

In the embodiment corresponding to view 4B, each configuration is associated with a binary value, for example in such a way that the increase of the binary values corresponding to the configurations corresponds to the increase or decrease of a characteristic, for example, the authorization level. Thus, for example, the higher the value corresponding to the configuration (or the lower, according to another embodiment), the higher the security level, and the higher the authorization level necessary to perform certain actions. Alternatively, the higher the value corresponding to the configuration (or the lower, according to another embodiment), the more elements 16 are accessible by the device, in other words are controllable by the microcontroller.

Portion B3, for example, corresponds to a binary value corresponding to a minimum configuration value capable of being installed. Thus, the configurations being associated with a binary value smaller than the value contained in portion B3 cannot be installed. Similarly, portion B4, for example, corresponds to a binary value corresponding to a maximum configuration value capable of being installed. Thus, the configurations being associated with a binary value greater than the value contained in portion B4 cannot be installed. Thus, only the configurations associated with a value in the range from the value of portion B3 to the value of portion B4 can be installed.

Alternatively, portion B3, for example, corresponds to a binary value corresponding to a minimum configuration value that cannot be installed. Thus, the configurations being associated with a binary value smaller than the value contained in portion B3 can be installed. Similarly, portion B4 for example corresponds to a binary value corresponding to a maximum configuration value that cannot be installed. Thus, the configurations being associated with a binary value greater than the value contained in portion B4 can be installed. Thus, only the configurations associated with a value in the range from the value of portion B3 to the value of portion B4 cannot be installed.

The word 24C of view 4C comprises, like word 24A, at least two portions: a first portion C1 and a second portion C2. Portion C1 is, for example, identical to portion A1. Portion C2 is, for example, identical to portion A2. Word 24B, for example, comprises a third portion C3.

As in the embodiment corresponding to view 4B, each configuration is associated with a binary value, for example in such a way that the increase of the binary values corresponding to the configurations corresponds to the increase or decrease of a characteristic, for example, the authorization level. Thus, for example, the higher the value corresponding to the configuration (or the lower, according to another embodiment), the higher the security level, and the higher the authorization level necessary to perform certain actions. Alternatively, the higher the value corresponding to the configuration (or the lower, according to another embodiment), the more elements 16 are accessible by the device, in other words are controllable by the microcontroller.

Portion C3 comprises two bits enabling to indicate whether it is possible to install a configuration associated with a higher value, or whether it is possible to install a configuration associated with a lower value.

For example, portion C3 may comprise a first binary value, for example, value 00, indicating that all the configurations can be installed, a second binary value, for example, value 11, indicating that none of the configurations can be installed, a third binary value, for example, value 01, indicating that only the configurations having a value higher than the current value, that is, the value in portion C2, can be installed, a fourth binary value, for example, value 10, indicating that only the configurations having a value lower than the current value, that is, the value in portion C2, can be installed.

Word 24 could have been only used to code the number of the installed configuration value, as is the case in current devices. However, it would then be possible to install a next version of a different configuration. Indeed, the configurations would be encrypted by the same key and word 24 would only be used to ascertain that a previous version is not installed. It would then be possible to install an unexpected configuration by performing the update.

An advantage of the described embodiments is that it is possible to ascertain that only certain configurations can be installed.

Various embodiments and variants have been described. Those skilled in the art will understand that certain features of these various embodiments and variants may be combined, and other variants will occur to those skilled in the art. In particular, although in the described embodiments, the different portions of words 24 are in a specific order, that is, the portion comprising the version number, the portion comprising the configuration number, and possibly at least another portion, these portions may be in a different order.

Finally, the practical implementation of the described embodiments and variants is within the abilities of those skilled in the art based on the functional indications given hereabove.

The invention claimed is:

1. A method of configuring an electronic device to support at least two configurations, wherein one of said at least two configurations is installed in the electronic device, the electronic device including a memory, the method comprising:
   storing a binary word in a limited-access region of the memory, said binary word comprising:
      a first value representative of a version of the one of said at least two configurations that is installed; and
      at least one second value indicating which other configurations of said at least two configurations are permitted to be installed; and
   determining according to the second value whether it is permitted to install a certain configuration;
   wherein the first value is contained in a first portion of the binary word and the second value is contained in a second portion of the binary word.

2. The method according to claim 1, wherein the memory comprises a read-only region having an encryption key configured to decrypt updates of configurations contained therein.

3. The method according to claim 2, wherein that encryption key is further used for the updating of all configurations.

4. The method according to claim 1, wherein files of supported configurations are all contained in the memory of the device.

5. The method according to claim 1, wherein only a manufacturer of the device can write the binary word.

6. The method according to claim 1, wherein each configuration is associated with a third value, and wherein the second portion comprises a first sub-portion having the third value contained therein that is representative of the one of said at least two configurations that is installed.

7. The method according to claim 6, wherein the third value associated with the configurations are classified in such a way that an increase of the value corresponds to an increase of a characteristic of the configurations.

8. The method according to claim 6, wherein the binary word only comprises the first portion and the first sub-portion, and configurations other than that associated with the third value cannot be installed.

9. The method according to claim 6, wherein the binary word comprises a second sub-portion indicating, for each supported configuration, whether the configuration can be installed or not.

10. The method according to claim 9, wherein the second sub-portion comprises one bit for each supported configuration, said one bit taking a fourth value if installation of said configuration is possible and a fifth value if installation of said configuration is not possible.

11. The method according to claim 6, wherein the binary word comprises a second sub-portion comprising a minimum value, and configurations associated with values smaller than the minimum value cannot be installed.

12. The method according to claim 6, wherein the binary word comprises a third sub-portion comprising a maximum value, and configurations associated with values greater than the maximum value cannot be installed.

13. The method according to claim 6, wherein the binary word comprises a second sub-portion comprising a first value to indicate that all configurations can be installed, a second value to indicate that no configuration can be installed other than the one of said at least two configurations that is installed, a third value to indicate that only configurations associated with a value smaller than the value of the one of said at least two configurations that is installed can be installed, and a fourth value to indicate that only configurations associated with a value greater than the value of the one of said at least two configurations that is installed can be installed.

14. A method of configuring an electronic device, wherein said electronic device includes a plurality of circuit functions, the method comprising:
   specifying a plurality of device configurations for the electronic device, wherein each device configuration identifies which one or ones of the circuit functions are permitted for use;
   storing a binary word in a limited-access region of a memory, said binary word comprising:
      a first value representative of a version of a currently installed one of the plurality of device configurations; and
      at least one second value indicating which of the other device configurations in said plurality of device configurations are permitted to be installed;
   determining according to the second value whether installation of another device configuration in said plurality of device configurations is permitted; and
   permitting use of the one or ones of the circuit functions identified by the installed device configuration;
   wherein the first value is contained in a first portion of the binary word and the second value is contained in a second portion of the binary word.

15. The method according to claim 14, wherein the memory comprises a read-only region having an encryption key configured to decrypt updates of device configurations contained therein.

16. The method according to claim 15, wherein that encryption key is further used for the updating of all device configurations.

17. The method according to claim 14, wherein the at least one second value comprises one of:

a first indication value specifying that all device configurations can be installed;

a second indication value specifying that no device configuration can be installed other than the currently installed one of the plurality of device configurations can be installed;

a third indication value specifying that only device configurations having a control value smaller than a control value of the currently installed one of the plurality of device configurations can be installed; and a fourth indication value specifying that only configurations having a control value greater than the control value of the currently installed one of the plurality of device configurations can be installed.

18. A method of configuring an electronic device including a memory, comprising:

storing by the electronic device a binary word in a limited-access region of the memory, said binary word comprising:

a first value specifying a version identifier for a configuration of the electronic device which is installed in the electronic device; and a second value indicating which other configurations for the electronic device are permitted to be installed in the electronic device; and receiving by the electronic device an updated configuration;

comparing by the electronic device a version identifier of the updated configuration with the version identifier of the installed configuration specified by the first value to confirm the version identifiers are different;

verifying by the electronic device that the updated configuration is permitted by comparison to the second value;

updating by the electronic device the first value with the version identifier of the updated configuration; and storing by the electronic device the updated configuration in the memory.

\* \* \* \* \*